(12) United States Patent
Kanbe et al.

(10) Patent No.: US 6,596,420 B2
(45) Date of Patent: *Jul. 22, 2003

(54) MAGNETIC RECORDING MEDIA AND MAGNETIC RECORDING SYSTEM USING THE SAME

(75) Inventors: Tetsuya Kanbe, Yokohama (JP); Akira Ishikawa, Kodaira (JP); Ichiro Tamai, Yokohama (JP); Yotsuo Yahisa, Odawara (JP); Yuzuru Hosoe, Hino (JP); Kiwamu Tanahashi, Fujisawa (JP); Yoshibumi Matsuda, Odawara (JP); Hiroyuki Kataoka, Kanagawa-ken (JP); Toshinori Ono, Odawara (JP); Shinji Fukaya, Odawara (JP); Kazuhiro Ura, Hiratsuka (JP); Naoto Endo, Odawara (JP); Tomoo Yamamoto, Nagaoka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/101,946

(22) Filed: Mar. 21, 2002

(65) Prior Publication Data

US 2002/0150796 A1 Oct. 17, 2002

Related U.S. Application Data

(63) Continuation of application No. 08/849,414, filed on May 9, 1997, now Pat. No. 6,403,240.

(30) Foreign Application Priority Data

May 20, 1996 (JP) .............................. 8-124334
Aug. 5, 1996 (WO) ............................... PCT/JP96/02198

(51) Int. Cl.[7] .............................. G11B 5/66; G11B 5/70
(52) U.S. Cl. ............................... 428/694 TS; 428/611; 428/667; 428/900
(58) Field of Search .......................... 428/694 TS, 900, 428/611, 667

(56) References Cited

U.S. PATENT DOCUMENTS 4,287,225 A    9/1981    Kneller et al. ................ 427/48

(List continued on next page.)

FOREIGN PATENT DOCUMENTS

EP    0 406 726 A2    1/1991

(List continued on next page.)

OTHER PUBLICATIONS

Article entitled, "The effect of alkali ion migration on the adhesion of sputtered chromium metallizations to glass", by R. J. Baird et al., J. Vac. Sci. Technol. A4(3) pp. 532–535.

(List continued on next page.)

Primary Examiner—Holly Rickman
(74) Attorney, Agent, or Firm—Kenyon & Kenyon

(57) ABSTRACT

A magnetic recording system includes an in-plane magnetic recording medium having a magnetic layer fabricated on a single underlayer or on a plurality of underlayers respectively fabricated on a substrate; a driver unit for driving the in-plane magnetic recording medium in a write direction; a magnetic head having a read unit and a write unit; a unit for moving the magnetic head relative to the in-plane magnetic recording medium; and a read/write signal processing unit for reading an output signal from the magnetic head and writing an input signal to the magnetic recording media, wherein the read unit of the magnetic head is a magnetoresistive head and the single underlayer or at least one of the plurality of underlayers is made of Co-containing amorphous material or fine crystal material, or is made of alloy material, the alloy material having as the main components at least one element selected from a group consisting of Cr, Mo, V and Ta and containing at least one element selected from a group consisting of B, C, P and Bi. The magnetic recording system can be realized which can read and write high density information and have high reliability.

5 Claims, 10 Drawing Sheets

U.S. PATENT DOCUMENTS

| | | | |
|---|---|---|---|
| 4,576,700 A | 3/1986 | Kadokura et al. | 204/192.2 |
| 4,657,824 A | 4/1987 | Howard | 428/611 |
| 4,722,869 A | 2/1988 | Honda et al. | 428/212 |
| 5,242,761 A | 9/1993 | Uchiyama | 428/694 T |
| 5,605,733 A | 2/1997 | Ishikawa et al. | 428/65.3 |
| 5,736,262 A | 4/1998 | Ohkijima et al. | 428/611 |
| 5,763,071 A | 6/1998 | Chen et al. | 428/332 |
| 5,772,857 A | 6/1998 | Zhang | 204/192.2 |
| 5,820,963 A | 10/1998 | Lu et al. | 428/65.3 |
| 5,851,643 A | 12/1998 | Honda et al. | 428/212 |
| 5,851,656 A | 12/1998 | Ohkubo | 428/332 |
| 5,922,442 A | 7/1999 | Lal et al. | 428/216 |
| 5,968,679 A | 10/1999 | Kobayashi et al. | 428/694 TS |
| 6,403,240 B1 * | 6/2002 | Kanbe et al. | 428/694 TS |

FOREIGN PATENT DOCUMENTS

| | | |
|---|---|---|
| JP | 61-267927 | 11/1986 |
| JP | 62-257618 | 11/1987 |
| JP | 62-293511 | 12/1987 |
| JP | 62-923512 | 12/1987 |
| JP | 63-187416 | 8/1988 |
| JP | 63-197018 | 8/1988 |
| JP | 2-29923 | 1/1990 |
| JP | 4-153910 | 5/1992 |
| JP | 5-128481 | 5/1993 |
| JP | 5-135343 | 6/1993 |
| JP | 6-104113 | 4/1994 |
| JP | 06-215348 | 8/1994 |
| JP | 07-037237 | 2/1995 |
| JP | 07-073427 | 3/1995 |
| JP | 07-073433 | 3/1995 |
| JP | 07-073441 | 3/1995 |
| JP | 07-262546 | 10/1995 |
| JP | 07-307020 | 11/1995 |

OTHER PUBLICATIONS

Article entitled, "Multilayer files of CocrTa for perpendicular recording media", by C.J. Robinson, IEEE Transactions on Magnetics, vol. MAG–22, No. 5, Sep. 1986, pp. 328–330.

* cited by examiner

20nm  PROJECTION  PROJECTION

MAGNETIC RECORDING MEDIA AND MAGNETIC RECORDING SYSTEM USING THE SAME

The present invention is a continuation and claims priority to the filing date of the parent application Ser. No. 08/849,414 filed May 19, 1997 by the above-named inventor, now U.S. Pat. No. 6,403,240. Applicant incorporates herein the application Ser. No. 08/849,414 now U.S. Pat. No. 6,403,240 its entirety for background information.

BACKGROUND OF THE INVENTION

The present invention relates to a magnetic recording system, and more particularly a magnetic recording system having a recording density of 2 gigabits or higher and a thin film magnetic recording medium with low noises for realizing such system.

Demands for large capacity of a magnetic recording system are increasing more and more nowadays. Conventionally, an inductive head has been used which utilizes a voltage change caused by a change of a magnetic flux with time. This inductive head performs both read and write. Recently, use of a composite head has expanded rapidly which uses different heads for read and write by introducing a magnetoresistive head having a higher sensitivity as a read head. The magnetoresistive head utilizes the phenomenon that the electrical resistance of the head element changes with a leakage flux change of a medium. A head having a much higher sensitivity constituted of a plurality of magnetic layers laminated between a plurality of non-magnetic layers laminated between those magnetic layers is now under development which utilizes a very large magenetoresistance change (giant magnetoresistive effect or spin valve effect). This giant magnetoresistive effect is an electrical resistance change to be caused by a change in relative directions of magnetization of a plurality of magnetic layers interposed between non-magnetic layers. And the relative direction change is caused by leakage fluxes of a recording medium.

Magnetic layers of magnetic recording media presently used in practice are made of alloy whose main components are Co such as CoCrPt, CoCrTa and CoNiCr. Such Co alloy has a hexagonal closed packed structure (hcp structure) having a c-axis as a magnetic easy axis. It is therefore preferable that an in-plane magnetic recording medium has the crystallographic orientation having the c-axis oriented along the in-plane direction. However, such an orientation is unstable so that it cannot be formed if Co alloy is directly deposited on a substrate. The (100) plane of Cr having a body centered cubic structure (bcc structure) has a good lattice matching with the (11.0) plane of Co alloy. By using this good lattice matching, first an underlayer of Cr having the (100) plane is fabricated on a substrate, and a Co alloy layer is epitaxially grown on the Cr underlayer to thereby form the (11.0) plane having the c-axis oriented in the in-plane direction. In order to further improve the crystal lattice matching at the interface between the Co alloy magnetic layer and the Cr underlayer, a second element is added to Cr to increase an interstitial distance. The (11.0) crystallographic orientation of Co alloy therefore increases further and coercivity can be increased. Examples of these techniques are to add V, Ti, or the like as disclosed in JP-A-62-257618 and JP-A-63-197018.

Factors necessary for high density magnetic recording include low noises as well as high coercivity of recording media. Media noises are mainly caused by an irregular zig-zag pattern formed in magnetization transition regions between recording bits. It is necessary to smooth these transition regions in order to reduce media noises. It is known that fine magnetic crystal grains and uniform crystal grain sizes are effective for reducing media noises. To this end, it is effective to make fine and uniform crystal grains of the underlayer. The above-described known techniques increase the lattice constant of the underlayer by adding a second element to the Cr underlayer, but do not make fine and uniform crystal grains of the underlayer. Therefore, although the above techniques are effective for increasing coercivity, they are not effective for reducing media noises.

Significant requisites for magnetic disk media are improvement of shock resistance. This shock resistance improvement is a very significant issue from the viewpoint of reliability of magnetic disk media, particularly for magnetic disk drives mounted on recent portable information apparatuses such as note type personal computers. Instead of using an Al alloy substrate with an NiP plated surface (hereinafter called an Al alloy substrate), using a glass substrate with a reinforced surface or a crystallized glass substrate can improve the shock resistance of magnetic disk media. As compared to conventional Al alloy substrates, the glass substrate has a smoother surface so that it is suitable for high density recording because it is effective for reducing a flying space between the magnetic heads and the medium. The glass substrate is, however, associated with some problems such as insufficient adhesion relative to the substrate and permeation of impurity ions on the substrate or adsorbed gas on the substrate surface into the Cr alloy underlayer. Of these problems, the film adhesion property in particular is degraded if the glass substrate is heated as reported in J. Vac. Sci. Technol. A4(3), 1986, at pp. 532 to 535.

Countermeasures for these problems include fabricating a film such as a metal film, an alloy film and an oxide film between the glass substrate and Cr alloy underlayer (JP-A-62-293512, JP-A-2-29923, JP-5-135343).

As compared to an Al alloy substrate, a glass substrate of an in-plane magnetic recording medium has worse electromagnetic conversion characteristics at high linear recording density regions. The reason for this is as in the following. A Cr alloy underlayer fabricated on a glass substrate directly or via a film made of one of metals or its alloy described in the above conventional techniques, does not display strong (100) orientation compared to it is fabricated on an Al alloy substrate. Therefore, the crystal plane other than the (11.0) plane of the Co alloy magnetic layer grows parallel to the substrate surface and the in-plane orientation of the c-axis as, which is magnetic easy axis becomes small. From this reason, coercivity lowers and a read output at high linear recording density lowers. Furthermore, if the glass substrate is used, crystal grains in the magnetic layer become bulky than using an Al alloy substrate, and the crystal grain size dispersion becomes larger by about 20 to 30%. These are main reasons to increased media noises and degraded electromagnetic conversion characteristics of media using the glass substrate. JP-A-4-153910 discloses that the size of crystal grains of a magnetic layer can be suppressed from becoming bulky and the magnetic characteristics can be improved if an amorphous film being made of Y and one of Ti, Zr, Hf, V, Nb, Ta, Cr, Mo, W and the like is inserted between the glass substrate and underlayer.

With this method, however, although the size of crystal grains of the magnetic layer may be reduced to some degree, the in-plane components of the magnetic easy axis reduce and this is not sufficient for a magnetoresistive head to realize a high recording density of 2 gigabits or more per square inches. Furthermore, the effects of reducing grain size distribution are rare and good electromagnetic conversion characteristics cannot be obtained.

Although a magnetoresistive head is suitable for high density recording because it has a very high read sensitivity, the sensitivity relative to noises also becomes high. Therefore, in-plane magnetic recording media with low noises are required more than ever.

In order to reduce media noise and obtain good electromagnetic conversion characteristics even at high recording density, it is necessary to make crystal grain size fine and reduce grain size distribution, without degrading the hcp (11.0) orientation of the Co alloy magnetic layer.

Furthermore, even if samples of a magnetic disk drive is manufactured for use with a combination of a low noise in-plane magnetic medium and a high sensitivity magnetoresistive head, sufficient electromagnetic conversion characteristics cannot be always obtained. This may be ascribed to independent developments of magnetic heads and in-plane magnetic recording media, and to insufficient consideration about the way of head-disk combination for high recording density of the magnetic disk drive.

SUMMARY OF THE INVENTION

It is an object of the invention to solve the above problems and provide a magnetic recording system having high reliability and a recording density of 2 gigabits per square inches or higher and an in-plane magnetic recording medium of low noises suitable for high density recording.

According to one aspect of the invention, a magnetic recording system is provided which comprises: an in-plane magnetic recording medium having a magnetic layer fabricated on a single underlayer or on a plurality of underlayers fabricated on a substrate; a driver unit for driving the in-plane magnetic recording medium in a write direction; a magnetic head having a read unit and a write unit; means for moving the magnetic head relatively to the in-plane magnetic recording medium; and read/write signal processing means for reading an output signal from the magnetic head and writing an input signal to the magnetic head, wherein the read unit of the magnetic head is a magnetoresistive head and the single underlayer or at least one of the plurality of underlayers of the medium is made of Co-containing amorphous material or fine crystal material, or is made of alloy material having at least one element selected from a group consisting of Cr, Mo, V and Ta as the main components and containing at least one element selected from a group consisting of B, C, P and Bi.

It is another object of the present invention to eliminate adhesion defects which are likely to occur when a film is fabricated after a glass substrate is heated. If the adhesion defects can be eliminated, the conditions of fabricating a film can be broadened to reduce noises of a recording medium, and the substrate can be heated immediately before a film is fabricated. It is therefore possible to remove impurity gas adsorbed on the substrate surface and to improve reproductivity of the magnetic film characteristics.

As described earlier, as compared to a conventional NiP plated Al alloy substrate, a glass substrate degrades the electrical characteristics because the in-plane component of the c-axis, which is the magnetic easy axis of a Co alloy magnetic layer is small and the crystal grain size is large. Crystal grains of the magnetic layer are epitaxially grown on crystal grains of the underlayer. Therefore, the orientation and size of crystal grains of the magnetic layer are generally affected by the crystal grain size and surface morphology of the underlayer. Basing upon these knowledge, the present inventors manufactured various in-plane magnetic recording media by changing materials of underlayers, layer structures, film thicknesses, film fabricating conditions, and the like, and evaluated the read/write characteristics in combination with composite magnetic heads having an inductive head as a write unit and a magnetoresistive head as a read unit. It has been found that the electrical characteristics can be improved by using a multi-layer structure of underlayers, and by inserting a new underlayer (hereinafter called a first underlayer) made of Co-containing amorphous material or fine crystal material, between the substrate and the bcc structure underlayer made of Cr alloy or the like which improves the crystal lattice matching with the magnetic layer. The details of this will be given in the following.

Amorphous means that a clear peak cannot be observed by X-ray diffraction measurements or that a clear refraction spot or ring cannot be observed by electron beam refraction measurements but a halo refraction ring can be observed. Fine crystal means that the crystal grain size is smaller than that of the magnetic layer, and preferably has an average grain size of 8 nm or smaller.

The components of the Co-containing amorphous or fine crystal material of the multi-layer underlayer are not limited specifically if the co-containing alloy contain any elements which form Co-containing amorphous or fine crystal material with Co. If the first underlayer made of Co-containing amorphous or fine crystal material is fabricated on a glass substrate, crystal grains of the underlayer constituted of Cr alloy or the like having the bcc structure and formed on the first underlayer (hereinafter called a second underlayer) are made fine and at the same time the (100) plane of the bcc structure is likely to grow parallel to the film surface. Therefore, crystal grains of the Co alloy magnetic film grow with its magnetic easy axis being parallel to layer the film plane direction and the grain size becomes small. So the coercivity can be increased and noises can be reduced. If amorphous or fine crystal material not containing Co is used, the crystal grain size of the magnetic layer becomes somewhat small in some cases. However, as shown in Embodiment 7, if the Co-containing amorphous or fine crystal material is used, the crystal grains are made finer and the crystal grain size dispersion becomes smaller. This may be ascribed to that the Co-containing amorphous or fine crystal material forms uniform and fine projections on the film surface and crystal grains of the second underlayer grow by using this uniform and fine projections as crystal seeds.

It is preferable that the structure of the first underlayer is an amorphous structure. The amorphous structure can realize media with lower noises than the fine crystal structure, because crystal grains of the second underlayer and magnetic layer are finer. However, even the structure of the first underlayer is the fine crystal structure which has an average crystal grain size of 8 nm or smaller, good electrical characteristics can be obtained. Although the fine crystal structure generates slightly higher noises, a read output at a high recording density becomes large because the magnetic layer has a strong (11.0) orientation. Therefore, this structure is suitable for use with a head having relatively high noises.

Specific material of the first underlayer is preferably alloy of Co and at least one additive element selected from a group consisting of Ti, Y, Zr, Nb, Mo, Hf, Ta, W, Si and B (hereinafter called the first group), or compound of Co and oxide of the additive element selected from the first group. The content of the additive element is preferably in the range from 5 at % or higher and 70 at % or lower. If the concentration of the additive element is smaller than 5 at %, crystal grains of the magnetic layer become larger than when the second underlayer is fabricated on a glass substrate directly, whereas if it is larger than 70 at %, components whose c-axis rises from the surface of the magnetic film become large and the vertical magnetic anisotropy becomes strong. Therefore, this outer range is not preferable. It is particularly preferable to use Zr, Ta or W in the group as the first additive element, because the in-plane orientation components of the magnetic easy axis become strong.

Magnetization of the first underlayer may affect the read/write characteristics. The first underlayer is therefore preferably made of non-magnetic material. However, it has been confirmed from our studies that if a product of a residual magnetic flux density and a film thickness of the first underlayer is 20% or smaller of a product of a residual magnetic flux density and a film thickness of the magnetic layer, there is no practical problem. If the product of the residual magnetic flux and the film thickness of the first underlayer exceeds 20% of the product of the residual magnetic flux and the film thickness of the magnetic layer, the base line of an output signal obtained by using an magnetoresistive head fluctuates and low frequency noises increase. This outer range is therefore not preferable. In order to avoid this, it is effective to make the first underlayer thin, to increase the concentration of the additive element, or to add a second additive element. Cr, V, Mn (hereinafter called the second group) or the like as the second additive element is effective because it lowers magnetization greatly.

The second underlayer is preferably Cr or alloy of Cr and at least one element selected from Ti, Mo and V. The second underlayer may be constituted of two layers having the bcc structure. If the second underlayer is made of alloy having as the main components at least one element selected from a group consisting of Cr, Mo, V and Ta (hereinafter called the third group) and containing at least one element selected from a group consisting of B, C, P and Bi (hereinafter called the fourth group), crystal grains of the underlayer become fine and the grain size becomes uniform. Therefore, crystal grains of the magnetic layer fabricated on the underlayer also become fine and uniform so that media noise can further be reduced.

FIG. 1 shows the dependence of normalized media noise and S/N on Br×t of media using a Cr—15 at % Ti underlayer or a underlayer added with 5 at % B, i.e., Cr—14.3 at % Ti—5 at % B. These media were manufactured by changing film structures and process conditions so that almost the same coercivities were obtained. A numeral and symbols affixed to the top of each element indicate the concentration of each element represented by an atomic percentage (at %). The normalized media noise is defined as media noise normalized by an output of an isolated read signal and a track width. In the following description, the media noise is evaluated by using this normalized media noise. The normalized noise is reduced by about 15% and the S/N is enhanced for the media using the CrTiB underlayer compared to the media using the CrTi underlayer at any values of Br×t is used. Similar to the CrTi underlayer, the CrTiB underlayer has the bcc structure and the (100) orientation, and the hcp (11.0) orientation of the Co alloy magnetic layer is not degraded.

FIG. 2 shows the relationship between the concentration of B added to the Cr—15 at % Ti—B underlayer and the normalized media noise. The media noise is reduced by the addition of B. However, if the B concentration exceeds 20 at %, the noise reduction effect disappears. This may be ascribed to degradation of crystal structure of the underlayer and hence degraded that of the magnetic layer. If the B concentration is smaller than 1 at %, finesse and uniformity of crystal grains are insufficient and the noise reduction effect is poor.

The noise reduction effect has been also confirmed when an element selected from the fourth group excepting B is added. Similar to the addition of B, the addition of P reduced noises considerably. On the other hand, the addition of C considerably enhanced the coercivity and coercivity squareness S*, and the addition of Bi allowed to fabricate media excellent in corrosion resistance. The concentration of these added elements is preferably 1 at % or higher and 20 at % or lower, and in the range from 2 to 8 at % in particular, media with low noises could be obtained.

In order to improve lattice matching at the interface between the underlayer and Co alloy magnetic layer and to improve the magnetic characteristics, an element such as V, Mo and the like as well as Ti may be added. It has been confirmed that if an element selected from the fourth group is added to the CrV alloy or CrMo alloy underlayer, crystal grains is made fine and uniform like it is added to CiTi alloy and the noise reduction effect occurs. As compared to the media having the CiTi or CrMo alloy underlayer containing an added element selected from the fourth group, the media having the CrV underlayer containing added element selected from the fourth group element, in particular, has good overwrite characteristics. If the fourth group element is added to the CrMo underlayer, a strong bcc (100) orientation and good crystal sturcutre are realized even at a relatively low temperature. Therefore, the carbon protective film can be fabricated at a low temperature with an improved film quality so that media having better CSS performance can be realized. From the synthetic comparison, it can be said as follows. Particularly, media having an underlayer of B-added CrTi alloy added with Ti for improving lattice matching, have the magnetic easy axis of Co alloy, strongly oriented in the in-plane direction and crystal grains are made fine and uniform to a large extent. Therefore, media can be realized having excellent read and write characteristics and satisfying both the high resolution and the low noise.

The magnetic layer may use alloy having Co as its main components, such as CoCrPt, CoCrPtTa, CoCrPtTi, CoCrTa and CoNiCr. In order to obtain a high coercivity, it is particularly preferable to use Co alloy which contains Pt. Magnetic alloy containing rare earth elements, such as SmCo and FeSmN, may also be used. It is known that an SmCo alloy film is made of very fine crystal grains. However, since the magnetic interaction between these crystal grains is strong, each crystal grain is not independent and discrete magnetically. If this film is fabricated on the underlayer having the bcc structure, an aggregation of SmCo alloy crystal grains fabricated on each underlayer crystal grain is considered to function as one magnetic unit. According to the invention, the first underlayer made of Co-containing amorphous or fine crystal material makes fine crystal grains of the second underlayer. Therefore, the magnetic unit of SmCo alloy is also made fine so that media noises can be reduced. The magnetic layer may be structured as a single layer or a plurality of layers interposed with intermediate layers. In this case, the thickness t of the magnetic layer as recited in claims means a total thickness of magnetic layers.

As to the magnetic characteristics of the magnetic layer, it is preferable to set the coercivity to 1.8 kilo oersteds or higher measured by applying a magnetic field in the write direction and the product of a residual magnetic flux density Br and a film thickness t to 20 gauss·micron or larger and 140 gauss·micron or smaller, because good read and write characteristics are obtained in the recording density range of 2 gigabits per square inches. It is not preferable to make the coercivity smaller than 1.8 kilo oersteds, because an output at a high recording density (200 kFCI or higher) lowers. If the product Br×t becomes larger than 140 gauss·micron, the resolution lowers, whereas if the product Br×t becomes smaller than 20 gauss·micron, a read output becomes small. This outer range is therefore not preferable.

A protective layer for the magnetic layer is formed by depositing carbon to a thickness of 5 to 30 nm and a lubricating layer made of, for example, adsorptive perfluoroalkyl-polyether is formed to a thickness of 1 to 20 nm. In this manner, a magnetic recording medium capable of high density recording with high reliability can be obtained. It is preferable to use as the protective layer a carbon film added with hydrogen, a film made of compound such as silicon carbide, tungsten carbide, (W—Mo)—C and (Zr—Nb)—N, or a film made of a mixture of such compound and carbon, because the slide resistance and corrosion resistance can be improved. It is also preferable to form fine projections on the surface of the deposited protective layer through plasma etching using a fine mask or the like, to form protrusions of different phases on the protective layer surface by using targets of compounds or mixed materials, or to form fine projections on the protective layer surface by heat treatment, because the contact area between the head and medium can be reduced so that adhesion of the head to the medium surface during CSS operations can be avoided.

It has been found that if the first underlayer made of Co-containing amorphous or fine crystal material of this invention is used, the adhesion property is good even if the first underlayer is fabricated after the glass substrate is heated, as in the case where the substrate is not heated. This good adhesion property can be supposed as resulting from a strong bond between cobalt which is the main components of the first underlayer and silicon or oxygen of the glass substrate. If compound of Co and the oxide of additive element selected from the first group is used, the adhesion property relative to the glass substrate can be improved further, and this compound is particularly suitable for the case where the flying amount (spacing between the magnetic head and medium) of the magnetic head slider is small and contact therebetween is likely to occur. As described above, according to the present invention, a specific layer for improving the adhesion property is not required. However, an underlayer may made of low melting point metal such as Al and Ag, alloy of such metal, or metal compound be fabricated between the substrate and the first underlayer in order to form projections on the medium surface and improve CSS characteristics.

If the second underlayer is made of alloy having as the main components at least one element selected from the third group consisting of Cr, Mo, V and Ta and containing at least one element selected from the fourth group consisting of B, C, P and Bi, the first underlayer may be a layer made of alloy having the Co-containing amorphous or fine crystal material or an orientation control layer of Ta or the like for making the second underlayer have the (100) orientation.

If metal such as Ti, Zr and Cr or its oxide is fabricated between the orientation control layer and the glass substrate, the adhesion property relative to the glass can be improved and diffusion of adsorbed gas on the substrate, impurity ions in the glass, or the like can be suppressed so that good magnetic characteristics are obtained.

It has been also confirmed that similar to the glass substrate, use of the underlayer stated above can make crystal grains of the magnetic layer fine and uniform even if an Ni—P plated Al alloy substrate is used.

It is preferable to set the space (shield space) to 0.35 µm or smaller between two shield layers sandwiching the magnetoresistive sensor unit of the magnetoresistive head of the in-plane magnetic recording system of this invention. The reason of setting such a space is that if the shield space is 0.35 µm or larger, the resolution lowers and a signal jitter becomes large.

The magnetoresistive head is constituted of a magnetoresistive sensor having a plurality of conductive magnetic layers and conductive non-magnetic layers disposed between these magnetic layers. This sensor generates a large resistance change when magnetization directions of each magnetic layers are relatively changed by an external magnetic field, which is called the giant magnetoresistive effect or spin value effect. In this case, the read output signal can be enhanced further and a magnetic recording system can be realized which has a high recording density of 3 gigabits per square inches and a high reliability.

DETAILED DESCRIPTION OF THE PREFERRED EMBODIMENTS

<Embodiment 1>

Figure 1:
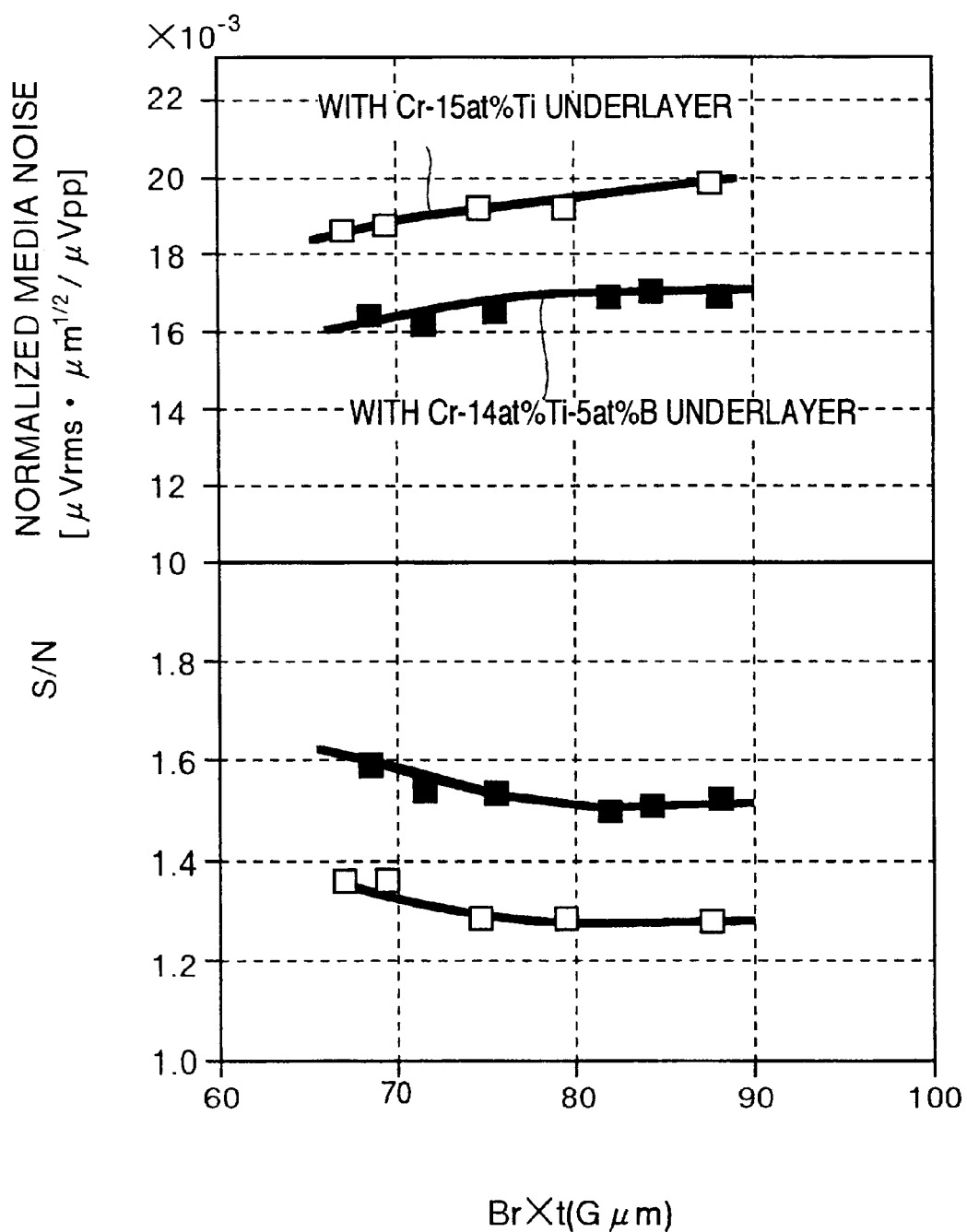
FIG. 1 is a graph showing a normalized media noise and a system S/N relative to Br×t of magnetic recording media according to the invention and according to compared examples.
Figure 2:
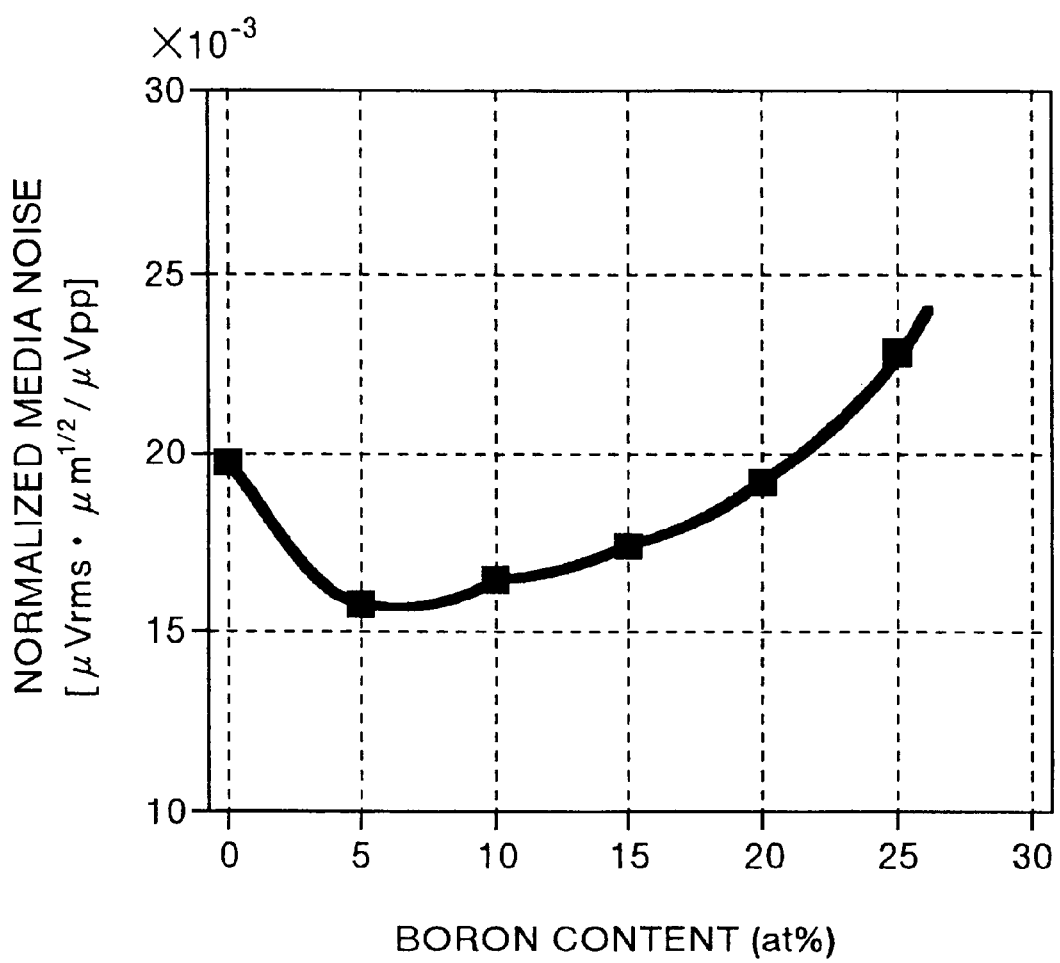
FIG. 2 is a graph showing a relationship between a concentration of B added to each underlayer of magnetic recording media and a normalized media noise, according to the invention.
Figure 3A:
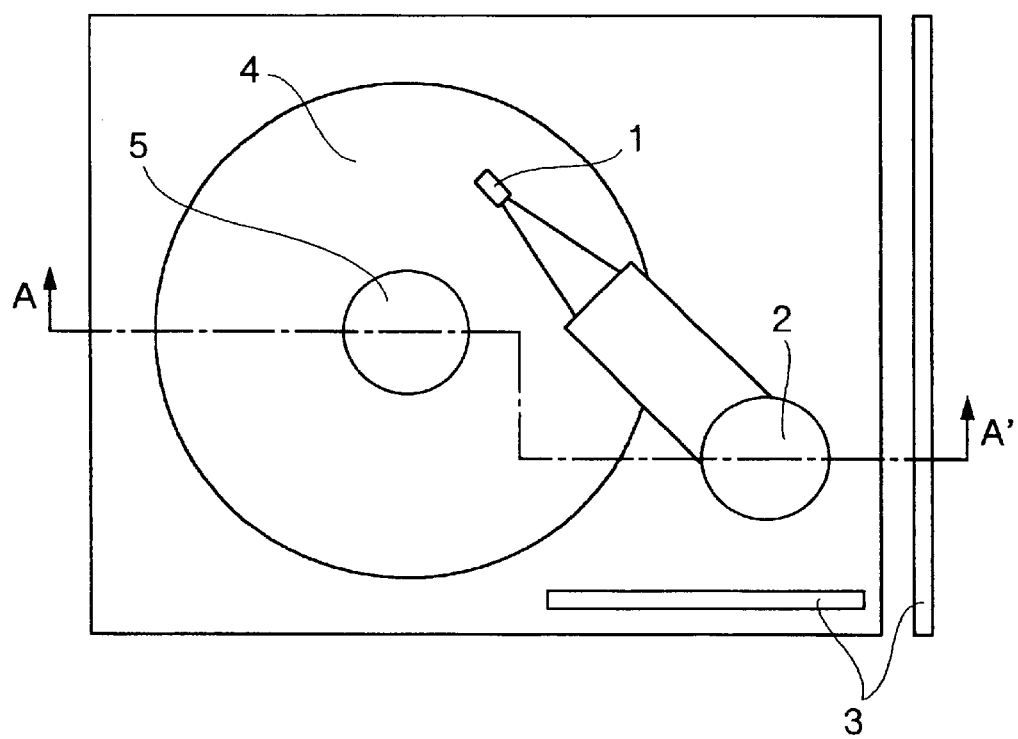
FIGS. 3A and 3B are a schematic plan view of a magnetic recording system according to Embodiment 1 of the invention and a cross sectional view taken along line A–A' of FIG. 3A.
Figure 3B:
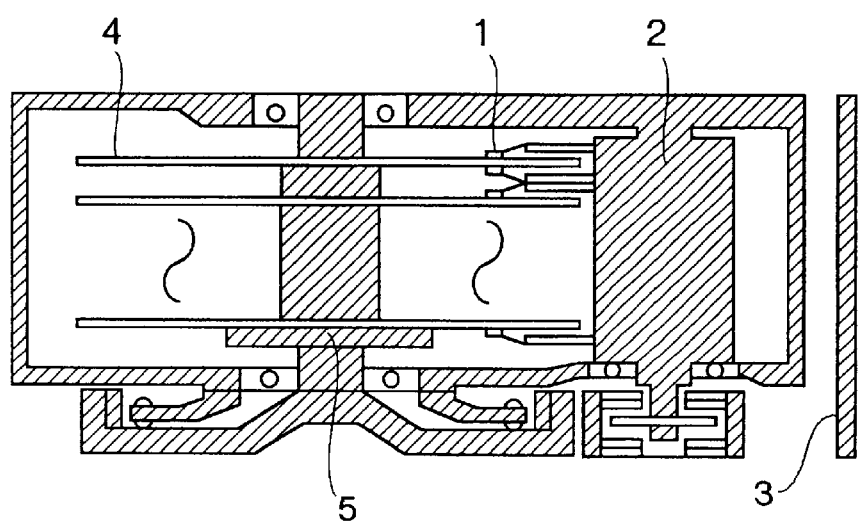

Embodiment 1 of the invention will be described with reference to FIGS. 3A to 5. FIG. 3A is a schematic plan view showing a magnetic recording system according to Embodiment 1, and FIG. 3B is a schematic cross sectional view of the magnetic recording system. This system has a known structure constituted of a magnetic head 1, its drive 2, a read/write signal processing unit 3 for the magnetic head, a magnetic recording medium 4, and a driver 5 for rotating the magnetic recording media.

Figure 4:
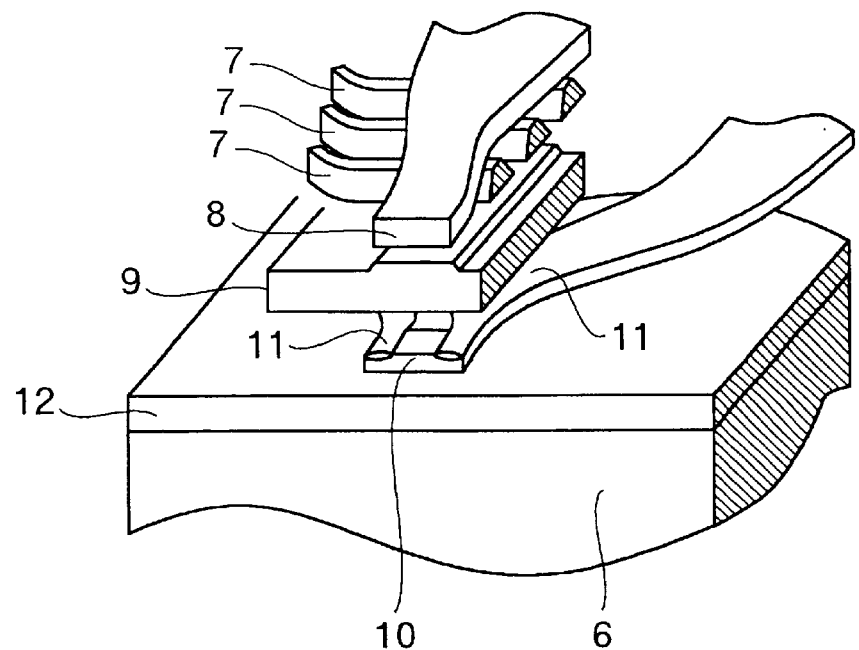
FIG. 4 is a perspective view showing an example of the structure of a magnetic head of the magnetic recording system of this invention.

The structure of the magnetic head is shown in FIG. 4. This magnetic head is a composite magnetic head having an inductive head for data write and a magnetoresistive head for data read respectively formed on a substrate 6. The data write head is constituted of an upper write magnetic pole 8 and a lower write magnetic pole and upper shield layer 9 sandwiching a coil 7, the thickness of a gap layer between the write poles being set to 0.3 µm. The coil was made of Cu having a thickness of 3 µm. The read head is constituted of a magnetoresistive sensor 10 and an electrode pattern 11 extending from opposite ends of the sensor 10. The magnetoresistive sensor is sandwiched between the lower read magnetic pole and upper shield layer and a lower shield layer 12 both having a thickness of 1 µgm. The distance between the shield layers is 0.25 µm. In FIG. 4, the gap layer between the write magnetic poles and the gap layer between the shield layer and magnetoresistive sensor are omitted.

Figure 5:
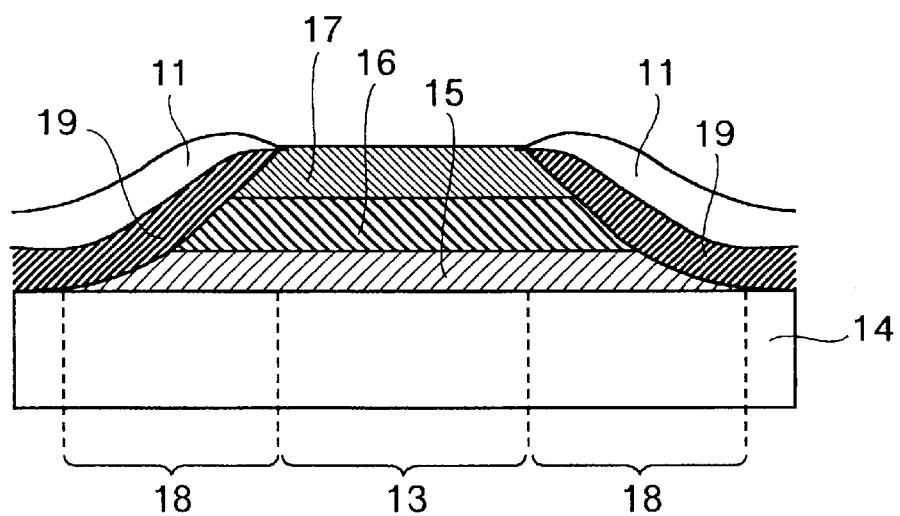
FIG. 5 is a schematic diagram showing an example of the structure in section of a magnetoresistive sensor of the magnetic head of the magnetic recording system of this invention.

FIG. 5 shows the cross sectional structure of the magnetoresistive sensor. A signal sensing region 13 of the magnetic sensor is a lamination of a traversal biasing layer 15, a separation layer 16 and a magnetoresistive ferromagnetic layer 17 sequentially formed on a gap layer 14 made of Al oxide. The magnetoresistive ferromagnetic layer was made of NiFe alloy of 20 nm. The traversal biasing layer was made of NiFeNb of 25 nm. Other ferromagnetic alloys such as NiFeRh may be used which has a relatively high electrical resistance and good soft magnetic characteristics. A magnetic field generated by a sense current flowing through the magnetoresistive ferromagnetic layer magnetizes the traversal biasing layer in the film in-plane direction (traverse direction) normal to the sense current so that a bias magnetic field is applied to the magnetoresistive ferromagnetic layer in the traverse direction. Therefore, the magnetic sensor is formed which can produce a read output linear to the leakage magnetic flux of the medium. The separation layer for preventing the sense current in the magnetoresistive ferromagnetic layer from flowing into the traversal biasing layer was made of Ta having a relatively high electrical resistance and the film thickness was set to 5 nm.

Opposite ends of the signal sensing region have tapered regions 18. The tapered regions are constituted of permanent magnet layers 19 for making the magnetoresistive ferromagnetic layer have a single magnetic domain and of a pair of electrodes 11 formed on the permanent magnet layers for picking up a read signal. It is necessary for the permanent magnet layer to have a large coercivity and not to be likely to change its magnetization direction. Alloys such as CoCr and CoCrPt are used.

Figure 6:
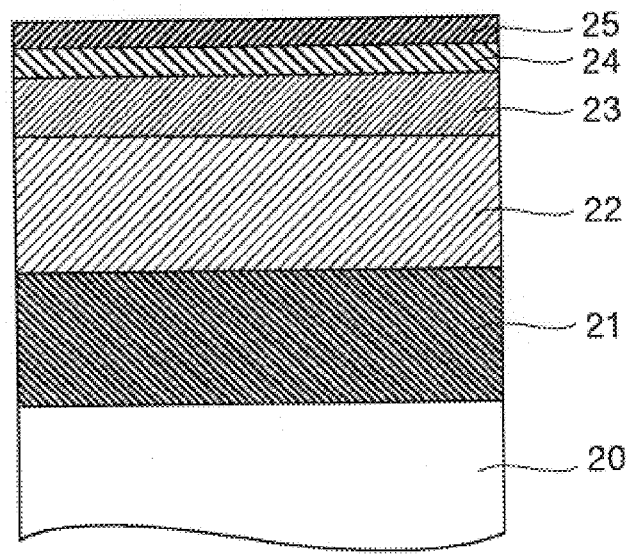
FIG. 6 is a schematic diagram showing an example of the structure in section of a magnetic recording medium of this invention.

FIG. 6 shows the layer structure of an in-plane magnetic recording medium of Embodiment 1. A substrate 20 was made of chemically reinforced soda lime glass washed with alkaline washing solution and spin-dried. On the substrate 20, a first underlayer 21 of 50 nm, a second under layer 22 of 30 nm made of Cr—15 at % Ti alloy, a magnetic layer 23 of 20 nm made of Co—20 at % Cr—12 at % Pt, and a carbon protective film 24 of 10 nm were fabricated by DC sputtering. The first underlayer was fabricated without heating the substrate, thereafter the substrate was heated with a lamp heater to 250° C. to fabricate the layers over the first underlayer. After the carbon protective film was fabricated, a lubricant layer 25 was formed by coating perfluoroalkyl-polyether diluted with fluorocarbon. Media using Cr—15 at % Ti as the first underlayer were fabricated under the conditions same as the above and used as compared examples.

The medium of Embodiment 1 had a coercivity of 2620 oersteds which is higher by about 400 oersteds than media of the compared examples, and had a product Br×t, i.e., residual magnetic flux density×magnetic layer thickness, of 85 gauss·micron. The media were assembled with the magnetic recording systems and the read/write characteristics were evaluated under the conditions of a linear recording density of 210 kBPI and a track density of 9.6 kTPI. The results showed an S/N of 1.8 which was higher about 15% than media of the compared examples.

Figure 7:
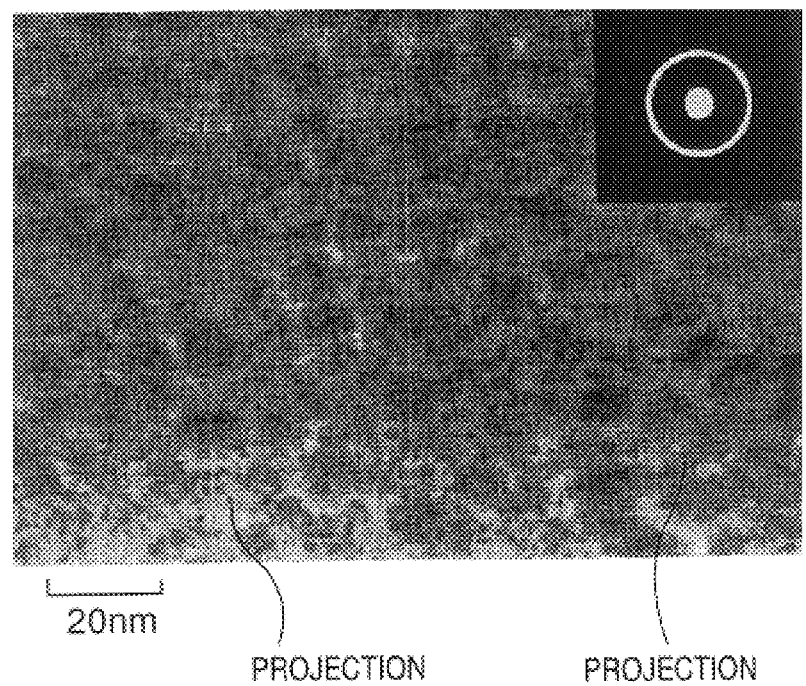
FIG. 7 is a schematic diagram showing a transmission electron microscopic plan image and a limited view field refraction pattern of a first underlayer containing Co of a magnetic recording medium according to Embodiment 1 of the invention.

A single first underlayer made of only CoCrZr was fabricated 50 nm thick on a glass substrate by the same depositing processes as above and X-ray diffraction measurements were performed. No clear diffraction peak was observed. The structure of the CoCrZr alloy film was investigated with a transmission electron microscope (TEM). A TEM image and a limited view field refraction pattern shown in FIG. 7 were observed. A white spot and a ring in the upper right corner of FIG. 7 are the limited view field refraction pattern. This limited view field refraction pattern was obtained from a region of about 0.5 micron diameter. A lattice image indicating a presence of lattice structure was not observed in this TEM image. The limited view field refraction pattern showed a halo refraction ring specific to an amorphous structure. From these facts it can be presumed that the CoCrZr alloy of the first underlayer has the amorphous structure. Variable depth of spot reflecting upon a fine projection on the surface of the first underlayer was observed in the TEM image. This projection is fairly uniform at a pitch of several nm.

Figure 8:
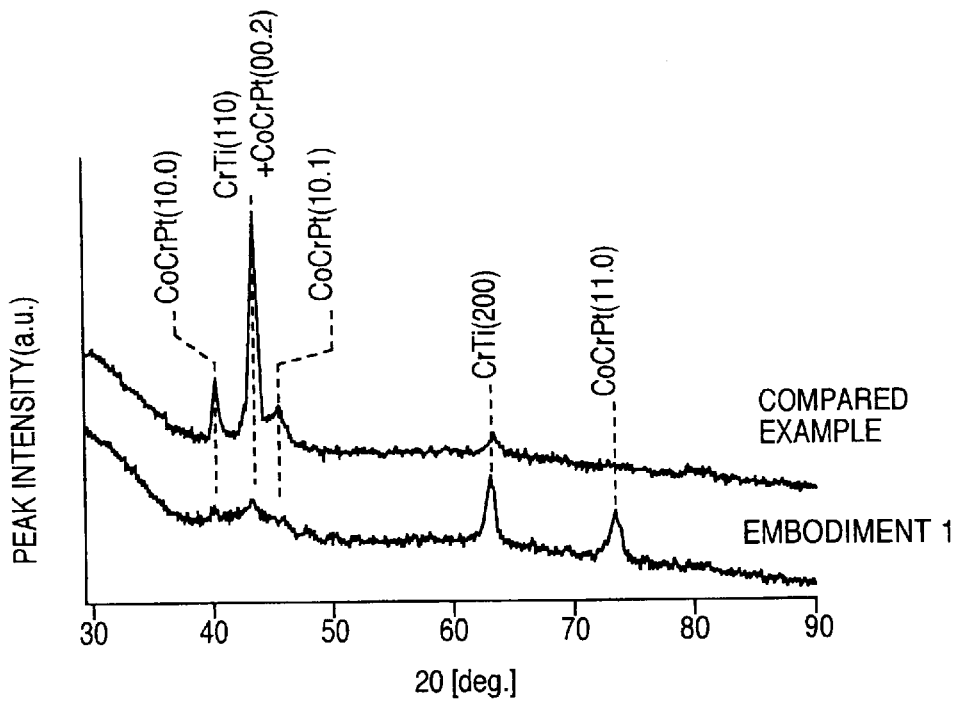
FIG. 8 is a schematic diagram showing X-ray diffraction patterns of magnetic recording media according to Embodiment 1 of the invention and according to compared examples.

X-ray diffraction measurements were performed for a medium of Embodiment 1 fabricated with the layers up to the carbon protective layer and for a medium of the compared example, and diffraction patterns shown in FIG. 8 were obtained. In the diffraction pattern of the medium of the compared example, it is impossible to discriminate between diffraction peaks of the first and second underlayers because they have the same compositions. It is also impossible to discriminate between the (110) peak of the body centered cubic structure (bcc structure) of the underlayer and the (00.2) peak of the hexagonal closed packed structure (hcp structure) because they are superposed one upon the other. But in any event, the second underlayer has no such a strong (100) orientation as the medium of Embodiment 1, and has a mixed phase of a plurality of crystal grains of different orientations. Accordingly, the CoCrPt alloy crystals of the magnetic layer take various crystal orientations and a plurality of diffraction peaks are observed in the CoCrPt magnetic layer. In contrast, in the case of the medium of Embodiment 1, the CoCrZr alloy of the first underlayer does not show diffraction peaks as stated above, the diffraction peaks shown in FIG. 8 are a bcc (200) peak of the second underlayer and an hcp (11.0) peak of the CoCrPt magnetic layer. It can be understood from these facts that the CrTi alloy of the second underlayer fabricated on the CoCrZr alloy layer of the amorphous structure has the (100) orientation and the CoCrPt magnetic layer fabricated on the second underlayer has the (11.0) orientation through epitaxial growth. Therefore, the in-plane components of the c-axis which is the magnetic easy axis of the CoCrPt alloy increase and good magnetic characteristics can be obtained. The lattice image of the magnetic layer was also observed by TEM. The results showed that the average grain size of the CoCrPt alloy of Embodiment 1 was about 16.1 nm which is smaller by about 3 nm than the compared example. Magnetization of the single layer CoCrZr alloy film was measured and a clear hysteresis curve was not obtained. It can therefore be supposed that the alloy film is non-magnetic.

<Embodiment 2>

In-plane magnetic recording media having the first underlayer of CoMnTa alloy were used in combination with the magnetic recording system similar to Embodiment 1.

The film structure of media is similar to Embodiment 1. After a reinforced glass substrate was heated to 150° C., a first underlayer of Co—36 at % Mn—10 at % Ta was fabricated 30 nm thick in a mixed gas atmosphere of Argon of 10 mTorr added with 5% of nitrogen. After the substrate was again heated to 250° C., a second underlayer of CrV alloy of 30 nm, a CoCrNiPt alloy magnetic layer of 30 nm and a carbon protective film of 10 nm were sequentially fabricated. Each layer over the second underlayer was fabricated at a pure argon gas pressure of 5 mTorr. The coercivity of the obtained medium was 2560 oersteds. In order to study the magnetization and film structure of a single first underlayer of Co-36 at % Mn-10% Ta, the single layer of 30 nm was fabricated on a reinforced glass substrate under the same conditions as above. Magnetization of this single layer was measured. The saturated magnetic flux was about 80 G. The grain size was estimated with a TEM image. The average grain size of the CoMnTa alloy single layer was about 3 nm or smaller. X-ray diffraction measurements were performed for media having layers up to the carbon protective film. Similar to Embodiment 1, it was found that the CrV alloy of the second underlayer had the (100) orientation, and the CoCrNiPt alloy had the (11.0) orientation because of epitaxial growth. TEM observation of the CoCrNiPt alloy of the magnetic layer was made. The average crystal grain size was about 19 nm. In Embodiment 2, the films were fabricated by DC sputtering. Other methods may be used with the same advantages as above, such as ion beam sputtering and ECR sputtering.

After lubricating material was coated, the read/write characteristics were measured under the conditions of a linear recording density of 210 kBPI and a track density of 9.6 kTPI. The system showed a high S/N of 1.8. Contact start/stop (CSS) tests were executed and the friction coefficient was 0.3 or lower after CSS tests were executed thirty thousands times. The number of bit errors was 10 bits/surface or smaller after the head seek tests were executed fifty thousands times from the inner to outer circumferences of a medium, and a mean time before failure of three hundred thousands hours was achieved.

<Embodiment 3>

In order to study the film adhesion property, following single first underlayers were fabricated on glass substrates and peeling tests were performed.

Figure 9:
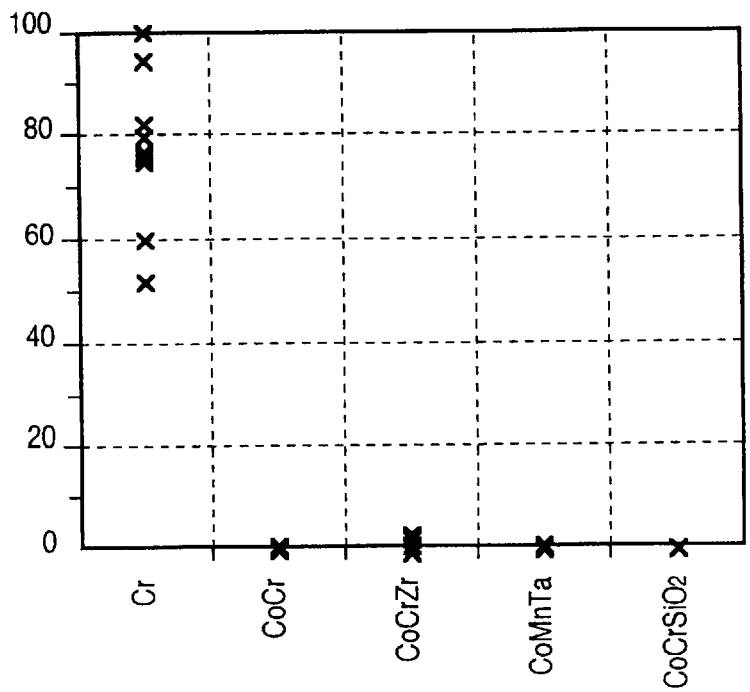
FIG. 9 is a diagram illustrating an adhesion property of the first underlayer of the magnetic recording medium according to Embodiment 3 of the invention.

The single first underlayers were made of CoCrZr alloy and CoMnTa alloy of Embodiments 1 and 2, Co—30 at % Cr alloy, and Co—20 at % Cr—10 at % $SiO_2$ alloy. The single layers of CoCrZr alloy and CoMnTa alloy were fabricated on glass substrates under the same conditions as above. The single layers of CoCr alloy and $CoCrSiO_2$ alloy were fabricated on glass substrates under the same conditions as Embodiment 2. The pealing tests were performed by scratching the film surfaces with a cutter to form 25 meshes of 3 mm×3 mm, by adhering tapes on the film surfaces, and by pealing the tapes after 40 to 48 hours. The film adhesion property was evaluated from the pealed area ratio. The results of the pealing tests are shown in FIG. 9. The first underlayers made of Co-containing alloy shows good adhesive performance. The first underlayer made of compounds of oxide and Co and the first underlayer of Embodiment 2 were better than the first underlayers of Embodiment 1.

<Embodiment 4>

In-plane magnetic recording media having the first underlayer of CoCrW alloy were used in combination with the magnetic recording system similar to Embodiment 1.

Similar to Embodiment 1, Co-25 at % Cr-12 at % W alloy was deposited on a reinforced glass substrate. In this case, the substrate was not heated and the argon gas pressure was changed in the range from 5 to 30 mTorr when alloy films were fabricated. After the underlayer was formed, the substrate was heated to 220° C. to sequentially fabricate a CrMo underlayer of 50 nm, a CoCrPtTa magnetic layer of 25 nm and a carbon protective layer of 10 nm.

Figure 10:
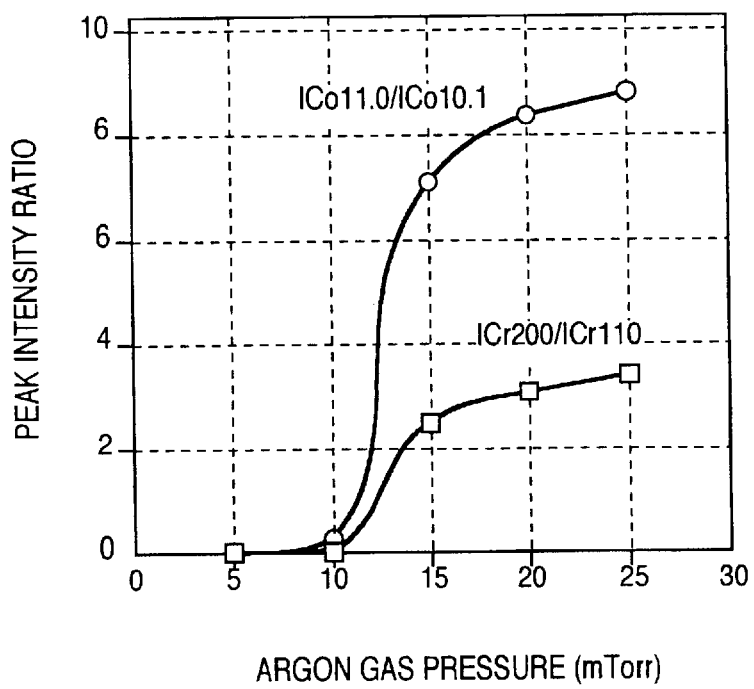
FIG. 10 is a graph showing a relationship between an argon gas pressure and a diffraction peak intensity ratio of a CrMo underlayer and a CoCrPtTa magnetic layer when a first underlayer of the magnetic recording medium according to Embodiment 4 of the invention is fabricated.
Figure 11:
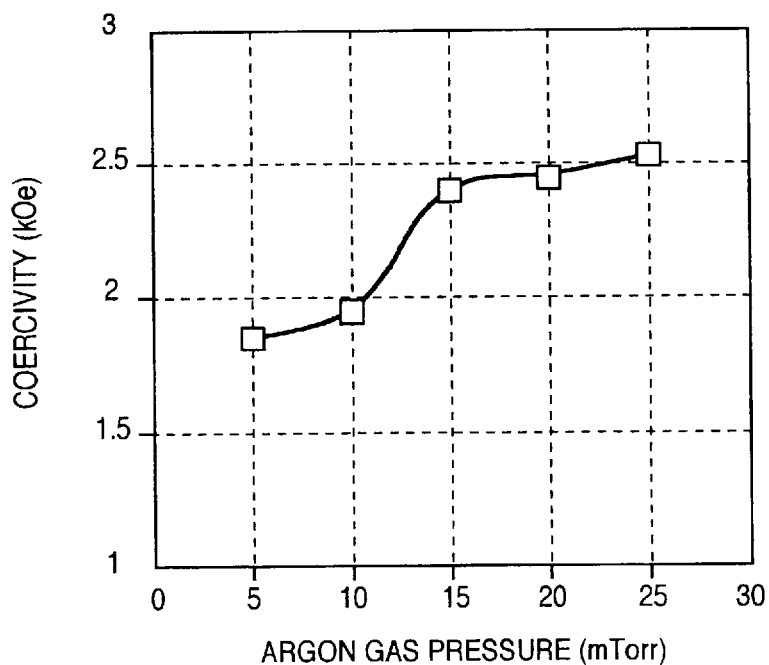
FIG. 11 is a graph showing a relationship between an argon gas pressure and a coercivity when a first underlayer of the magnetic recording medium according to Embodiment 4 of the invention is fabricated.

Similar to Embodiments 1 and 2, only the first underlayer of CoCrW alloy was fabricated on a glass substrate at the argon gas pressure in the range from 5 to 25 mTorr, and X-ray diffraction measurements were performed. At a relatively low argon gas pressure in the range from 5 to 10 mTorr during the film deposition, a strong hcp (00.2) peak was observed in the CoCrW single layer and it was found that this layer had the hcp structure oriented in the (00.1) plane. As the argon gas pressure was increased, the intensity of the (00.2) peak greatly lowered and a clear diffraction peak could not be observed at the gas pressure of 15 mTorr or higher. Media having layers up to the carbon protecting film were subject to X-ray diffraction measurements. From measured diffraction patterns, an intensity ratio of the (200) peak to the (100) peak of the second underlayer of CrMo alloy and an intensity ratio of the (11.0) peak to the (00.2) peak of the magnetic layer were calculated, and the relationship relative to the argon gas pressure during the film deposition was checked. The results are shown in FIG. 10. Notations given in FIG. 10, for example, ICo11.0, means a (11.0) diffraction peak intensity of the CoCrPtTa layer. Similar notations are also used for other peak intensities. At an argon gas pressure of 10 mTorr or lower during the deposition of the first underlayer, the second underlayer of CrMo alloy shows the bcc (110) orientation and the magnetic layer of CoCrPtTa alloy shows the hcp (10.1) orientation. At an argon gas pressure of 15 mTorr or higher, the (110) peak intensity of the second underlayer lowers greatly but the (200) peak increases greatly. Similarly, the peak intensity ratio of the CoCrPtTa alloy magnetic layer changes greatly and the (11.0) peak increases greatly. FIG. 11 shows the relationship between a coercivity of media and a gas pressure during the deposition of the CoCrW alloy layer. The coercivity rises greatly at the boundary near the argon gas pressure of 10 to 15 mTorr at which the crystallographic orientation changes greatly. It has been found from the above observations that if the first underlayer of CoCrW alloy is fabricated at the argon gas pressure of 15 mTorr or higher, this underlayer becomes amorphous or fine crystals so that the CrMo underlayer takes the (100) orientation and the CoCrPtTa magnetic layer takes the (11.0) orientation and coercivity increases.

Similar tendencies were found even if the second underlayer was made of other Cr alloys such as CrTi and CrV or even if the magnetic layer was made of other Co alloys such as CoCrPt and CoCrTa.

After lubricating material was coated, the read/write characteristics were measured under the conditions of a linear recording density of 210 kBPI and a track density of 9.6 kTPI. The system S/N was improved as the argon gas pressure was increased during the deposition of CoCrW alloy, and was 1.6 or higher at 15 mTorr or higher. The number of bit errors was 10 bits/surface or smaller after the head seek tests were executed fifty thousands times from the inner to outer circumferences of a medium, and a mean time before failure of three hundred thousands hours was achieved.

<Embodiment 5>

Figure 12:
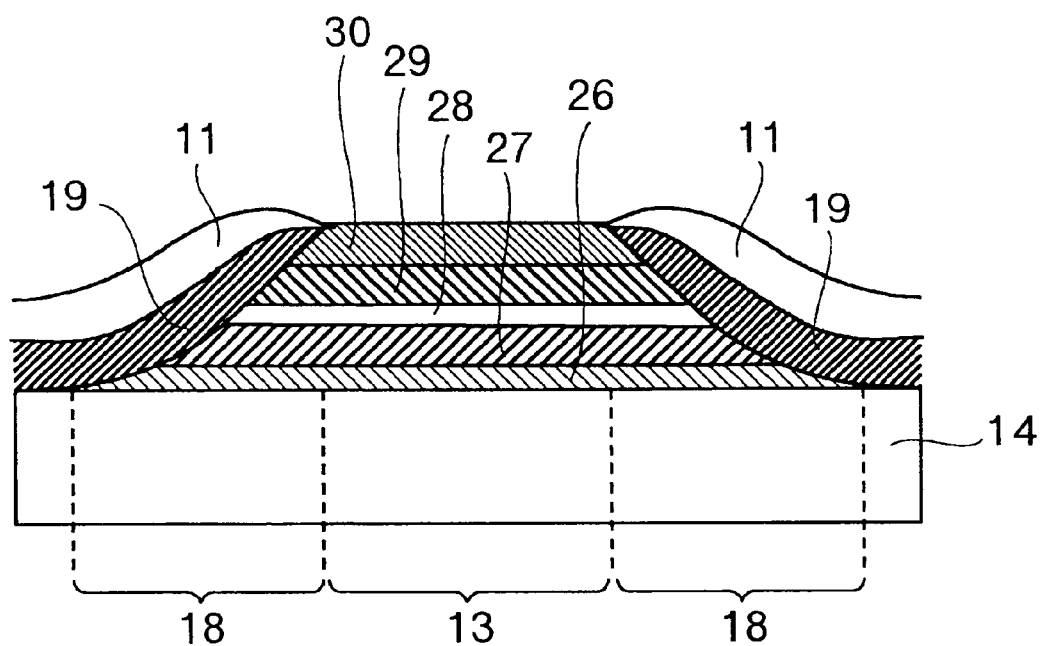
FIG. 12 is a schematic diagram showing an example of the structure in section of a magnetoresistive sensor of a magnetic head of the magnetic recording system according to Embodiment 5 of this invention.

A sensor shown in FIG. 12 was used as the read magnetic head of a magnetic recording system similar to Embodiment 1. The sensor had a structure that on a gap layer 14, a Ta buffer layer 26 of 5 nm, a first magnetic layer 27 of 7 nm, a Cu intermediate layer 28 of 1.5 nm, a second magnetic layer 29 of 3 nm, and an antiferromagnetic alloy layer 30 of 10 nm of Fe—50 at % Mn were sequentially fabricated. The first magnetic layer was made of Ni—20% at Fe alloy, and the second magnetic layer was made of Co. Magnetization of the second magnetic layer is fixed in one direction by exchange magnetic field of the antiferromagnetic layer. The direction of magnetization of the first magnetic layer in contact with the non-magnetic layer under the second magnetic layer changes with leakage magnetic field of a magnetic recording medium so that electrical resistance thereof changes. A resistance change with a relative change of magnetization directions of the two magnetic layers is called the spin valve effect. In Embodiment 5, a spin valve type magnetic head utilizing this effect was used as the read head. The tapered regions have the same structure as Embodiment 1.

The magnetic recording medium used in Embodiment 5 had a first underlayer, a second underlayer, a magnetic layer, a carbon protective layer sequentially fabricated on a glass substrate by the same manufacture processes as Embodiment 1. The first underlayer was made of Co—40 at % V—12 at % M alloy of 20 nm (M=Ti, Y, Zr, Nb, Mo, Hf, Ta, W, B), the second underlayer was made of CrTi alloy of 50 nm, and the magnetic layer was made of CoCrPt alloy of 22 nm.

The TEM observation results showed that the first underlayer was an amorphous structure or a fine crystal structure near the amorphous structure. The X-ray diffraction measurement results showed that the second underlayer of CrTi alloy had the (100) orientation and the magnetic layer of CoCrPt alloy had the (11.0) orientation. These tendencies were also true for the first underlayer made of any one of Co—V—M alloys. Table 1 shows a coercivity, a coercivity squareness and an intensity ratio (with a notation of ICo11.0/ICo10.1) of the (11.0) peak to (10.1) peak of the CoCrPt magnetic layer, respectively of a recording medium having the first underlayer made of each of Co—V—M alloys.

TABLE 1

| | the first underlayer | Coercivity (kOe) | Coercive squareness | Peak intensity ratio ($I_{Co11.0}/I_{Co10.1}$) |
|---|---|---|---|---|
| Embodiment 5 | Co-40 at % V-12 at % Ti | 2.46 | 0.79 | 6.0 |
| | Co-40 at % V-12 at % Y | 2.32 | 0.75 | 5.4 |
| | Co-40 at % V-12 at % Zr | 2.61 | 0.84 | 11.8 |
| | Co-40 at % V-12 at % Nb | 2.41 | 0.79 | 8.3 |
| | Co-40 at % V-12 at % Mo | 2.29 | 0.77 | 6.2 |
| | Co-40 at % V-12 at % Hf | 2.54 | 0.81 | 9.8 |
| | Co-40 at % V-12 at % Ta | 2.55 | 0.83 | 10.5 |
| | Co-40 at % V-12 at % W | 2.59 | 0.77 | 11.2 |
| | Co-40 at % V-12 at % B | 2.32 | 0.79 | 6.7 |
| Compared example | Cr | 1.98 | 0.67 | <0.1 |

Table 1 also shows a compared example having the first underlayer made of Cr. CrTi of the second underlayer of the compared example has a strong (110) orientation so that the CoCrPt magnetic layer has a (10.1) orientation and there is no peak (11.0) of the magnetic layer. In contrast, each CoCrPt magnetic alloy of media of Embodiment 5 has a strong (11.0) orientation. Therefore, the in-plane components of the c-axis which is the magnetic easy axis of the magnetic alloy are large, and a high coercivity and a high coercivity squareness can be obtained. If M=Zr, Ta, or W in particular, the (11.0) refraction of the CoCrPt magnetic layer becomes strong and the in-plane components of the magnetic easy axis become larger.

After lubricating material was coated, the read/write characteristics were measured under the conditions of a recording density of 3 gigabits per square inches. Each medium showed a high S/N of 1.6 or higher. Each medium of Embodiment 5 had a friction coefficient of 0.2 or smaller even after CSS tests were performed thirty thousands times, and showed CSS characteristics better than media of Embodiment 2.

<Embodiment 6>

In-plane magnetic recording media having the first underlayer were used in combination with the magnetic recording system similar to Embodiment 1. Instead of the Co—30 at % Cr—10% Zr alloy layer of Embodiment 2, the layer of Co—30 at % Cr alloy added with oxide such as Ti, Y, Zr, Nb, Mo, Hf, Ta, W and B was used for the first underlayer.

The TEM observation results showed that the first underlayer was of an amorphous structure or of a fine crystal structure near the amorphous structure. The X-ray diffraction measurement results showed that the second underlayer of CrTi alloy had the (100) orientation and the magnetic layer of CoCrPt alloy had the (11.0) orientation. Table 2 shows a coercivity, a coercivity squareness and an intensity ratio ICo11.0/ICo10.1 of the media using each first underlayer.

TABLE 2

| the first underlayer | Coercivity (kOe) | Coercive squareness | Peak intensity ratio ($I_{Co11.0}/I_{Co10.1}$) |
|---|---|---|---|
| (Co-30 at % Cr)-12 mol % $TiO_2$ | 2.37 | 0.76 | 4.8 |
| (Co-30 at % Cr)-11 mol % $Y_2O_3$ | 2.42 | 0.77 | 5.2 |
| (Co-30 at % Cr)-13 mol % $ZrO_2$ | 2.63 | 0.85 | 11.9 |
| (Co-30 at % Cr)-12 mol % $NbO_2$ | 2.39 | 0.76 | 7.6 |
| (Co-30 at % Cr)-9 mol % $MoO_2$ | 2.18 | 0.72 | 3.8 |
| (Co-30 at % Cr)-11 mol % $HfO_2$ | 2.48 | 0.79 | 8.6 |
| (Co-30 at % Cr)-12 mol % $Ta_2O_5$ | 2.57 | 0.84 | 12.1 |

TABLE 2-continued

| the first underlayer | Coercivity (kOe) | Coercive squareness | Peak intensity ratio ($I_{Co11.0}/I_{Co10.1}$) |
|---|---|---|---|
| (Co-30 at % Cr)-10 mol % $WO_2$ | 2.52 | 0.81 | 11.1 |
| (Co-30 at % Cr)-8 mol % $B_2O_3$ | 2.16 | 0.73 | 5.2 |

As shown, if Zr, Ta, or W oxide is added, the (11.0) diffraction peak of the CoCrPt magnetic layer becomes strong and the in-plane components of the magnetic easy axis become larger.

After lubricating material was coated, the read/write characteristics were measured under the conditions of a recording density of 2 gigabits per square inches. Each medium showed a high S/N of 1.6 or higher. Each medium of Embodiment 6 had a friction coefficient of 0.2 or smaller even after CSS tests were performed thirty thousands times, and showed CSS characteristics better than media of Embodiment 2.

<Embodiment 7>

In-plane magnetic recording media having the same film structure as Embodiment 1 were manufactured which had the second underlayer constituted of two layers including a Cr layer of 10 nm and a Cr—15 at % Ti alloy layer of 20 nm. The other structures and film deposition processes are the same as Embodiment 1. As compared examples, magnetic recording media were fabricated having the first underlayer made of Y (yttrium)—M alloy (M=Ti, Nb, V, Ta) or Cr.

Figure 13A:
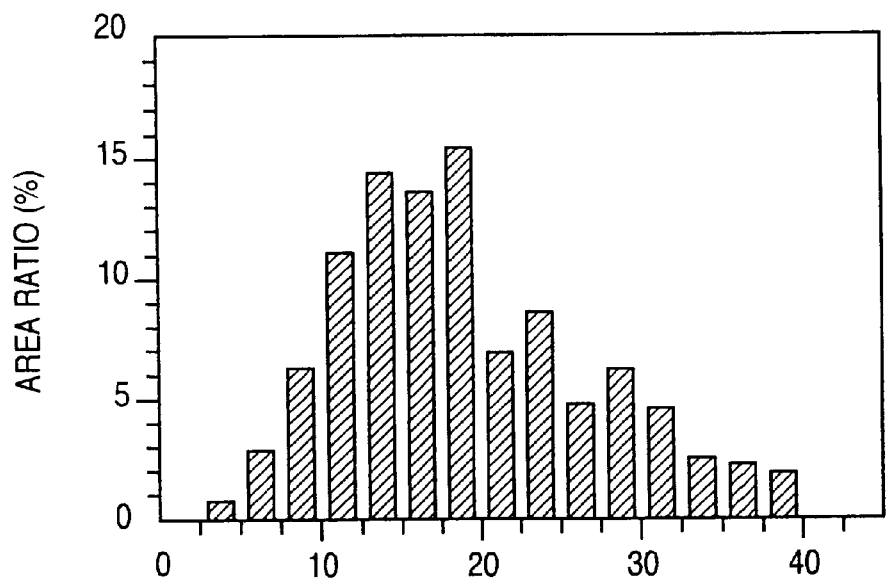
FIGS. 13A and 13B are diagrams showing a crystal grain size distribution and an accumulated area ratio curve of a magnetic layer of the magnetic recording medium according to Embodiment 7 of the invention.
Figure 13B:
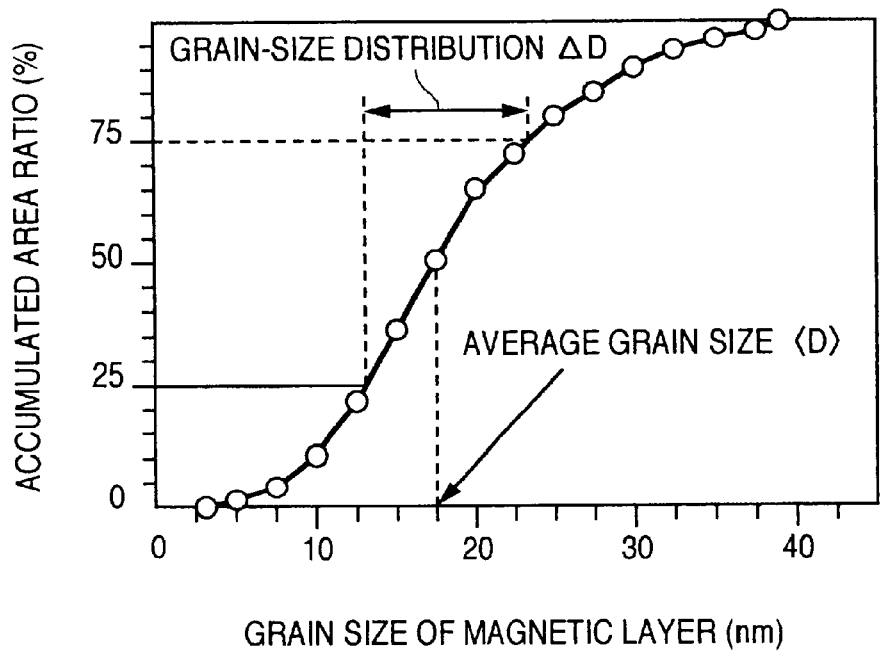

The coercivity of a medium of Embodiment 7 was 2710 oersteds. The coercivity of a medium of the compared example having the first underlayer made of Y—M alloy with M=V was 2030 oersteds which is smaller than the medium of Embodiment 7. Similar coercivities were obtained for M=Ti, Nb and Ta. This coercivity difference results from a difference of intensities of the (11.0) orientation of magnetic layers. Namely, if Y—M alloy is used as the first underlayer, the (11.0) orientation of the magnetic layer is not so strong as the media of Embodiment 1 so that good magnetic characteristics cannot be obtained. FIG. 13A shows a crystal grain size distribution in the magnetic layer of a medium of Embodiment 7 obtained from a TEM plan image. FIG. 13B is an accumulated area ratio curve obtained from the data shown in FIG. 13A, indicating the relation between a grain size and area ratio of crystal grains which size is smaller than it. The average grain size obtained from this data was 17.5 nm and the size dispersion was 10.1 nm. The average grain size <D> was set to the grain size at a 50% value of the accumulated area ratio of FIG. 13B, and the grain size dispersion width AD was set to a difference between values at 75% and 25% of the accumulated area ratio. Table 3 shows the average grain size and grain size dispersion width of media of Embodiment 7 and compared examples.

TABLE 3

| | the first underlayer | <D> | <ΔD> |
|---|---|---|---|
| Embodiment 7 | Co-30 at % Cr-10 at % Zr | 17.5 nm | 10.1 nm |
| Compared example | V-10 at % Y | 19.8 nm | 12.7 nm |
| | Cr | 21.0 nm | 13.1 nm |

As compared to the first underlayer made of Y—V alloy or Cr, the first underlayer made of Co alloy had the grain size of the magnetic layer finer by about 10 to 20%, and had the grain size dispersion width narrower by about 25 to 30%. This may be ascribed to that the distribution of crystal seed generation sites at the surface of the Co alloy of the first underlayer is more uniform.

The read/write characteristics were evaluated under the same conditions as Embodiment 1. The medium of Embodiment 7 had an S/N of 1.9, whereas the medium of the compared example having the first underlayer made of Y—M alloy had an S/N of about 0.8 to 1.1. This may be ascribed as described previously, to a lowered read output because of weak (11.0) orientation of the magnetic layer caused by weakened (100) orientation of the bcc underlayer and to increased media noises caused by irregular grain sizes of the Co alloy magnetic layer. These tendencies were also observed when the magnetic layer was made of other Co alloys. It can be understood from the above that the first underlayer made of Co alloy gives performance better than the first underlayer made of Y—M alloy. The medium having the second underlayer made of two layers of Cr and CrTi can have a higher coercivity and a higher S/N than the medium of Embodiment 1. This is because Cr on the first Co alloy underlayer gives the (100) orientation stronger than CrTi.

<Embodiment 8>

In-plane magnetic recording media were used in combination with the magnetic recording system similar to Embodiment 1. This magnetic recording medium has a first underlayer, a second underlayer, a third underlayer, a Co alloy magnetic layer and a carbon protective film, respectively fabricated on a reinforced glass substrate. The main object of the first underlayer is to prevent permeation of ions and adsorbed gas in the glass and to provide a good adhesion property relative to the glass. The main object of the second underlayer is to give CrB alloy of the third underlayer the (100) orientation. The main object of the third underlayer is to give the Co magnetic layer the (11.0) orientation. The first underlayer was made of 50 nm Zr, the second underlayer was made of 10 nm Ta, the third underlayer was made of Cr—14.3 at % Ti—5 at % B alloy formed by adding 5 at % B to 30 nm Cr—15 at % Ti alloy, the magnetic layer was made of Co—20 at % Cr—12 at % Pt alloy, and the protective layer was made of carbon. These layers were sequentially fabricated in the vacuum. All the layers were deposited by DC sputtering at an argon gas pressure of 5 mTorr in the film depositing rate of 5 to 8 nm/sec. The substrate was heated to 300° C. after the second Ta underlayer was fabricated. A lubricant layer was fabricated by coating perfluoroalkyl-polyether diluted with fluorocarbon. Media having the third underlayer made of Cr—15 at % Ti alloy without adding B and having the coercivity generally the same as Embodiment 8 were fabricated and used as compared examples.

The medium of Embodiment 8 had a coercivity of 2900 oersteds and Brxt of 82 gauss·micron. Media of Embodiment 8 and compared examples were assembled with magnetic recording systems similar to Embodiment 1, and the read/write characteristics were evaluated under the conditions of a head flying amount of 30 nm, a linear recording density of 210 kBPI and a track density of 9.6 kTPI. As compared to the media of compared examples, the media of Embodiment 8 reduced the normalized media noise by about 20%, and improved the overwrite property by about 10 dB. Therefore, at the recording density of 2 gigabits per square inches, good read/write characteristics were realized. It can be understood from the above that addition of B to the underlayer is effective for reducing media noises and improving the overwrite property.

<Embodiment 9>

In-plane magnetic recording media formed on Al alloy substrates having a diameter of 2.5 inches, a thickness of 0.635 mm and the surface NiP plated (hereinafter called an NiP/Al substrate) were used in combination with the magnetic recording system similar to Embodiment 1.

After the NiP/Al alloy substrate textured in the circumferential direction was heated to 300° C., a Cr—14.3 at % Ti—5 at % B alloy layer of 10 to 30 nm, a CoCrPt alloy layer of 20 nm and a carbon protective layer of 10 nm were sequentially fabricated. The argon gas pressure was changed in the range from 5 to 15 mTorr when magnetic layers were fabricated. Br×t of the media was in the range from 70 to 90 gauss·micron. Because of texturing of the substrate, the media had magnetic anisotropy in the circumferential direction. Therefore, the coercivity is larger in the circumferential direction than in the radial direction, and its ratio, i.e., its orientation ratio was 1.4 to 1.6. The magnetization direction was therefore stabilized in the write direction and good write characteristics were obtained.

Figure 14:
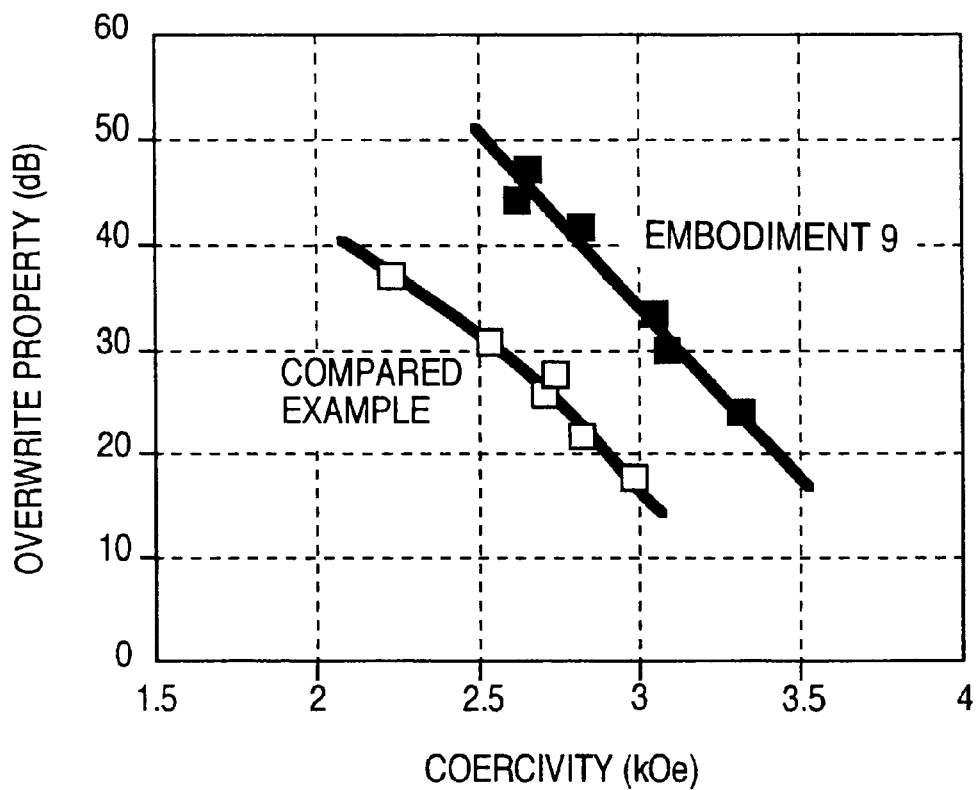
FIG. 14 is a graph showing a relationship between coercivity and overwrite property of magnetic recording media according to Embodiment 9 of the invention and according to compared examples.

The read/write characteristics of these media were evaluated under the same conditions as Embodiment 1. A relationship between the coercivity and the overwrite property is shown in FIG. 14. In FIG. 14, the evaluation results of compared examples are also shown, the media of the compared examples being manufactured by the same processes of Embodiment 9 and having a Cr—15 at % Ti underlayer not added with B. If media having the same degree of coercivities are compared to each other, the overwrite performance of the media having the Cr—14.3 at % Ti—5 at % B underlayer was improved by about 15 dB which indicates addition of B to the underlayer improves the overwrite performance. The read/write characteristics was considerably excellent at the recording density of 2 gigabits per square inches.

The X-ray diffraction measurement results showed that the CrTiB underlayer had a strong bcc (100) orientation, and the CoCrPt magnetic layer formed thereon had a strong (11.0) orientation caused by epitaxial growth. This orientation is similar to the case using the CrTi underlayer not added with B. Namely, even if B is added, the orientation of the underlayer does not change so that the (11.0) orientation of the CoCrPt magnetic layer with the excellent magnetic characteristics is not degraded.

<Embodiment 10>

In-plane magnetic recording media, although they have the structure similar to Embodiment 1, the sensor of Embodiment 5 is used for the read head, were used in combination with the magnetic recording system similar to Embodiment 1.

The film deposition processes of in-plane magnetic recording media of Embodiment 10 will be described. After the textured NiP/Al substrate is heated to 260° C. with a lamp, a first Cr underlayer of 20 nm, a second CrB alloy underlayer of 30 nm, a CoCrPt magnetic layer of 25 nm and a carbon protective layer of 10 nm were sequentially fabricated by DC sputtering. The first Cr underlayer functions to control the bcc (100) orientation of the second underlayer. As the CrB alloy of the second underlayer, Cr—14.3 at % Ti—5 at % B alloy, Cr—14.3 at % V—5 at % B alloy or Cr—14.3 at % Mo—5 at % B alloy were used. Media having the second underlayer made of Cr—15 at % Ti alloy, Cr—15 at % V alloy or Cr—15 at % Mo alloy not added with B were also fabricated and used as compared examples.

After lubricating material was coated, the media were assembled with the magnetic recording systems using the above-described magnetoresistive sensors, and the read/write characteristics were measured under the same conditions as Embodiment 1. The results are shown in Table 4.

TABLE 4

| | Underlayer | Coercivity [kOe] | Normalised media noise [μ Vrms · μm$^{1/2}$/μ Vpp] | Overwrite property [dB] |
|---|---|---|---|---|
| Compared example | Cr-15 at % Ti | 2.75 | 19.6 × 10$^{-3}$ | 28.2 |
| | Cr-15 at % V | 2.69 | 19.7 × 10$^{-3}$ | 30.2 |
| | Cr-15 at % Mo | 2.81 | 21.5 × 10$^{-3}$ | 28.5 |
| Embodiment 10 | Cr-14.3 at % Ti-5 at % B | 2.81 | 16.7 × 10$^{-3}$ | 37.7 |
| | Cr-14.3 at % V-5 at % B | 2.71 | 17.7 × 10$^{-3}$ | 44.1 |
| | Cr-14.3 at % Mo-5 at % B | 2.79 | 19.1 × 10$^{-3}$ | 32.2 |

Any of the media of Embodiment 10 reduced the normalized media noise by 10% or more as compared to the media of compared examples, and improved the overwrite performance. Therefore, good read/write characteristics were realized at the recording density of 2 gigabits per square inches.

The media of Embodiment 10, the media having the CrTiB underlayer had a lowest normalized media noise and the most excellent overwrite performance.

<Embodiment 11>

In combination of the magnetic recording system similar to Embodiment 1, in-plane magnetic recording media were used having the underlayer made of Cr—14.3 at % Mo—5 at % B alloy, Cr—14.3 at % Mo—5 at % C alloy, Cr—14.3 at % Mo—5 at % P alloy or Cr—14.3 at % Mo—5 at % Bi alloy.

After the NiP/Al substrate was heated to 250° C., an underlayer of each alloy of 30 nm, a CoCrPtTa magnetic layer of 20 nm and a carbon protective layer of 10 nm were sequentially formed. After lubricating material was coated, the read/write characteristics were measured under the same conditions as Embodiment 1. Media having the underlayer made of CrTi alloy of 30 nm were also formed and evaluated under the same conditions and used as compared examples.

All the underlayers of the media of Embodiment 11 had the bcc structure and the (100) orientation, and the magnetic layer had the (11.0) orientation through epitaxial orientation. The read/write characteristics of the media of Embodiment 11 and compared examples are shown in Table 5.

TABLE 5

| | Underlayer | Coercivity [kOe] | Normalised media noise [μ Vrms · μm$^{1/2}$/μ Vpp] | Overwrite property [dB] |
|---|---|---|---|---|
| Compared example | Cr-15 at % Ti | 2.58 | 19.1 × 10$^{-3}$ | 31.2 |
| Embodiment 11 | Cr-14.3 at % Ti-5 at % B | 2.62 | 16.8 × 10$^{-3}$ | 43.8 |
| | Cr-14.3 at % Ti-5 at % C | 2.78 | 18.2 × 10$^{-3}$ | 33.1 |
| | Cr-14.3 at % Ti-5 at % P | 2.55 | 17.2 × 10$^{-3}$ | 41.7 |
| | Cr-14.3 at % Ti-5 at % Bi | 2.69 | 18.3 × 10$^{-3}$ | 39.5 |

Any of the media of Embodiment 11 reduced media noises as compared to the media of compared examples, and improved the overwrite performance. Therefore, good read/write characteristics were realized at the recording density of 2 gigabits per square inches.

The media of Embodiment 11, the media having the CrTiB underlayer or the CrTiP underlayer had lower media noises. It can be understood that addition of B or P is effective for noise reduction. The media having the CrTiC underlayer has the strongest hcp (11.0) orientation, a high coercivity and a high coercivity squareness S*. As compared to other Embodiments, the media having the CrTiBi underlayer had good corrosion resistance. The CSS tests of the media of Embodiment 11 showed a good friction coefficient of 0.3 or smaller even after CSS were performed thirty thousands times.

<Embodiment 12>

On a reinforced glass substrate similar to Embodiment 1, the first underlayer of Cr—13.5 at % Ti—10 at % B of 10 nm was fabricated and thereafter the substrate was heated to 200° C. to sequentially fabricate the second underlayer of Cr—10 at % Ti alloy of 30 nm, a CoCrPt magnetic layer of 25 nm and a carbon protective film of 10 nm.

X-ray diffraction measurements were performed. The diffraction pattern showed only the bcc (200) peak presumably of the underlayer and the hcp (11.0) peak of the CoCrPt alloy layer. The Cr—13.5 at % Ti—10 at % B alloy of the first underlayer and the Cr—10 at % Ti alloy of the second underlayer have lattice constants very near to each other. Therefore, it is difficult to judge which underlayer has the bcc (200) peak. In this connection, a CrTiB single layer of 10 nm was fabricated under the same conditions as depositing the media above, and X-ray diffraction measurements were performed. Since a clear peak was not observed in the obtained diffraction pattern, it can be presumed that the bcc (200) peak is generated by the CrTiB alloy of the second underlayer. It can be understood therefore that the CiTiB alloy of the first underlayer has an amorphous structure or a fine crystal structure near the amorphous structure and that the CrTi layer fabricated thereon has the (100) orientation. Therefore, the Co alloy magnetic layer takes the (11.0) orientation through epitaxial growth. If the CiTiB alloy of the first underlayer is 30 nm or thicker, it has a strong (110) orientation so that the CiTi alloy of the second underlayer has the (110) orientation and the CoCrPt alloy layer has a (10.1) orientation. As compared to the CoCrPt layer with the (11.0) orientation, the CoCrPt layer with the (10.1) orientation reduces the in-plane components of the c-axis, which is magnetic easy axis and degrades the magnetic characteristics. So, this structure is not preferable.

The coercivity of a medium having the first underlayer of 10 nm was 2480 oersteds. This medium was assembled with the magnetic recording system similar to Embodiment 5 and the read/write characteristics were evaluated. An overwrite performance was 45 dB. The number of bit errors was 10 bits/surface or smaller after the head seek tests were executed fifty thousands times from the inner to outer circumferences of a medium, and a mean time before failure (MTBF) of one hundred and fifty thousands hours was achieved.

Although the film deposition of Embodiment 12 was performed through DC sputtering, other methods may be used obviously with the same advantageous effects, such methods including RF sputtering, ion beam sputtering, and ECR puttering.

What is claimed is:

1. An in-plane magnetic recording medium comprising:
   a first underlayer formed on a substrate,
   a magnetic layer
   a second underlayer having a body-centered cubic lattice structure that is formed between said first underlayer and said magnetic layer, wherein,
   said first underlayer is composed of an amorphous material including Co.

2. An in-plane magnetic recording medium comprising:
   a first underlayer formed on a substrate,
   a recording layer including ferromagnetic material
   a second underlayer having a body-centered cubic lattice structure that is formed between said first underlayer and said magnetic layer, wherein,
   said first underlayer is composed of an amorphous material including Co.

3. An in-plane magnetic recording medium according to claim 1, wherein
   said first underlayer includes at least one additive element selected from the group consisting of Ti, V, Zr, Nb, Mo, Hf, Ta, Si and B.

4. An in-plane magnetic recording medium according to claim 1, wherein,
   said second underlayer contains Cr as a main component.

5. An in-plane magnetic recording medium according to claim 1, wherein
   said magnetic layer contains Co and includes a hexagonal closed packed lattice structure.

* * * * *

UNITED STATES PATENT AND TRADEMARK OFFICE
CERTIFICATE OF CORRECTION

PATENT NO.    : 6,596,420 B2
DATED         : July 22, 2003
INVENTOR(S)   : Tetsuya Kanbe et al.

It is certified that error appears in the above-identified patent and that said Letters Patent is hereby corrected as shown below:

Column 15,
Line 51, change "width AD" to -- width $\Delta D$ --.

Signed and Sealed this

Twenty-second Day of June, 2004

JON W. DUDAS
*Acting Director of the United States Patent and Trademark Office*